United States Patent
Ashmore et al.

(10) Patent No.: US 7,080,208 B2
(45) Date of Patent: Jul. 18, 2006

(54) METHOD FOR DATA RETENTION IN A DATA CACHE AND DATA STORAGE SYSTEM

(75) Inventors: Paul Ashmore, Longmont, CO (US); Michael Huw Francis, Winchester (GB); Robert Bruce Nicholson, Southsea (GB); Simon Walsh, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 10/635,275

(22) Filed: Aug. 6, 2003

(65) Prior Publication Data

US 2004/0049638 A1    Mar. 11, 2004

(30) Foreign Application Priority Data

Aug. 14, 2002   (GB) ................................ 0218891.0

(51) Int. Cl.
G06F 12/12 (2006.01)
(52) U.S. Cl. ........................ 711/136; 711/159; 711/160
(58) Field of Classification Search ..................... None
See application file for complete search history.

(56) References Cited

U.S. PATENT DOCUMENTS

| | | | | |
|---|---|---|---|---|
| 5,551,003 A | * | 8/1996 | Mattson et al. | 711/136 |
| 5,734,861 A | * | 3/1998 | Cohn et al. | 711/134 |
| 5,933,840 A | * | 8/1999 | Menon et al. | 707/206 |
| 6,021,509 A | * | 2/2000 | Gerdt et al. | 714/7 |
| 6,336,164 B1 | * | 1/2002 | Gerdt et al. | 711/113 |
| 6,490,664 B1 | * | 12/2002 | Jones et al. | 711/154 |
| 6,941,420 B1 | * | 9/2005 | Butterworth et al. | 711/114 |

* cited by examiner

Primary Examiner—T Nguyen
(74) Attorney, Agent, or Firm—Randall J. Bluestone; Harrington & Smith, LLP

(57) ABSTRACT

A method for data retention in a data cache and a data storage system are provided. The data storage system (100) includes a storage controller (102) with a cache (103) and a data storage means (106). The cache (103) has a first least recently used list (104) for referencing dirty data which is stored in the cache (103), and a second least recently used list (105) for clean data in the cache (103). Dirty data is destaged from the cache (103) when it reaches the tail of the first least recently used list (104) and clean data is purged from the cache (103) when it reaches the tail of the second least recently used list (105).

39 Claims, 3 Drawing Sheets

METHOD FOR DATA RETENTION IN A DATA CACHE AND DATA STORAGE SYSTEM

CLAIM OF FOREIGN PRIORITY

This application is filed with a claim of priority under 35 U.S.C.§119(a) to foreign application Serial No. 0218891.0, filed in the United Kingdom on 14 Aug. 2002, and entitled "Method and Data Retention in a Data Cache and Data Storage System."

FIELD OF THE INVENTION

This invention relates to data storage systems. In particular, this invention relates to a method and system for data retention in a data cache.

BACKGROUND OF THE INVENTION

In existing, well-known write caching systems, data is transferred from a host into a cache on a storage controller. The data is retained temporarily in the cache until it is subsequently written ("destaged") to a disk drive or RAID array.

In order to select the region of data to destage next, the controller firmware uses an LRU (Least Recently Used) algorithm. The use of an LRU algorithm increases the probability of the following advantageous events happening to the data in the cache.
1. Data in the cache may be overwritten with updated data before being destaged, so that write operations from the host result in only one destage operation to the disk, thereby reducing disk utilisation.
2. Data in the cache may be combined with logically-adjacent data (coalesced) to form a complete stride for destaging to a RAID 5 array, thereby avoiding the read-modify-write penalty typically encountered when writing to a RAID 5 array.
3. An attempt by the host to read data which it has recently written may be serviced from the cache without the overhead of retrieving the required data from the disk. This improves the read response time.

Data in the cache must be protected against loss during unplanned events (e.g. resets or power outages). This is typically achieved by including battery backed memory or UPS (uninterruptible power supply) to allow the data to be retained during such events.

However, the provision of such backup power is difficult and expensive so a design decision is often taken such that the controller may not have sufficient power available to retain the contents of all of its cache memory. Consequently, the controller has areas of cache memory which cannot be used for write caching (since the data stored therein would be vulnerable to loss).

Such areas of the cache may, however, be used as a read cache (since this data does not need to be written to the storage device). Such a read cache would be used independently of the write cache.

When a write is received from the host and data is transferred into the cache, it is then known as "dirty" data. Sometime later it is destaged to the disk but may be retained in the cache. It is then known as "clean" data.

If a read command is received from the host for the region of memory corresponding to the cached data then the read command may be satisfied from the clean data in the cache, or a combination of contiguous clean and dirty spans of data.

The clean data in the cache needs to be discarded at some point to allow higher-priority clean data to be retained. The problem is selecting the next clean data entry to discard. This process is known as purging.

SUMMARY OF THE INVENTION

The present invention provides for a data cache in which the write and read areas of the cache are not separated and the same area of memory can function as either write cache or read cache. Cached read data and cached write data are handled in the same contiguous areas of memory.

According to a first aspect of the present invention there is provided a method for data retention in a data cache, comprising: referencing dirty data stored in a cache in a first least recently used list; and referencing clean data in the cache in a second least recently used list; wherein dirty data is destaged from the cache when it reaches the tail of the first least recently used list and clean data is purged from the cache when it reaches the tail of the second least recently used list.

Dirty data which is destaged to a data storage means may have a copy of the data retained in the cache as clean data which is deleted from the first list and added to the second list.

A read command which is a cache miss may fetch data from a data storage means and the data may be retained in the cache with a reference in the second list.

The method may include keeping a flag with each data reference in the first list indicating whether or not the data has been read whilst on the first list. If the data was read when referenced in the first list, the data may be added to the head of the second list when the data is destaged. If the data was not read when referenced in the first list, the data may be either maintained in its position in the second list or discarded.

The flag may include a timestamp each time the data is read and the timestamp may be used to prioritise the position of the data reference in the second list.

Data may be partly dirty and partly clean and may be referenced in both the first and second lists.

According to a second aspect of the present invention there is provided a data storage system comprising: a storage controller including a cache; a data storage means; and the cache has a first least recently used list for referencing dirty data which is stored in the cache, and a second least recently used list for referencing clean data; wherein dirty data is destaged from the cache when it reaches the tail of the first least recently used list and clean data is purged from the cache when it reaches the tail of the second least recently used list.

Dirty data which is destaged to a data storage means may have a copy of the data retained in the cache as clean data which is deleted from the first list and added to the second list.

A read command which is a cache miss may fetch data from the data storage means and the data may be retained in the cache with a reference in the second list.

A flag may be provided with each data reference in the first list indicating whether or not the data has been read whilst on the first list. If the data was read when referenced in the first list, the data may be added to the head of the second list when the data is destaged. If the data was not read when referenced in the first list, the data may be either maintained in its position in the second list or discarded.

The flag may include a timestamp each time the data is read and the timestamp may be used to prioritise the position of the data reference in the second list.

Data may be partly dirty and partly clean and may be referenced in both the first and second lists.

According to a third aspect of the present invention there is provided a computer program product stored on a computer readable storage medium, comprising computer readable program code means for retaining data in a data cache by performing the steps of: referencing dirty data stored in a cache in a first least recently used list; and referencing clean data in the cache in a second least recently used list; wherein dirty data is destaged from the cache when it reaches the tail of the first least recently used list and clean data is purged from the cache when it reaches the tail of the second least recently used list.

BRIEF DESCRIPTION OF THE DRAWINGS

An embodiment of the present invention will now be described, by means of an example only, with reference to the accompanying drawings, in which.

DETAILED DESCRIPTION OF THE INVENTION

Figure 1:
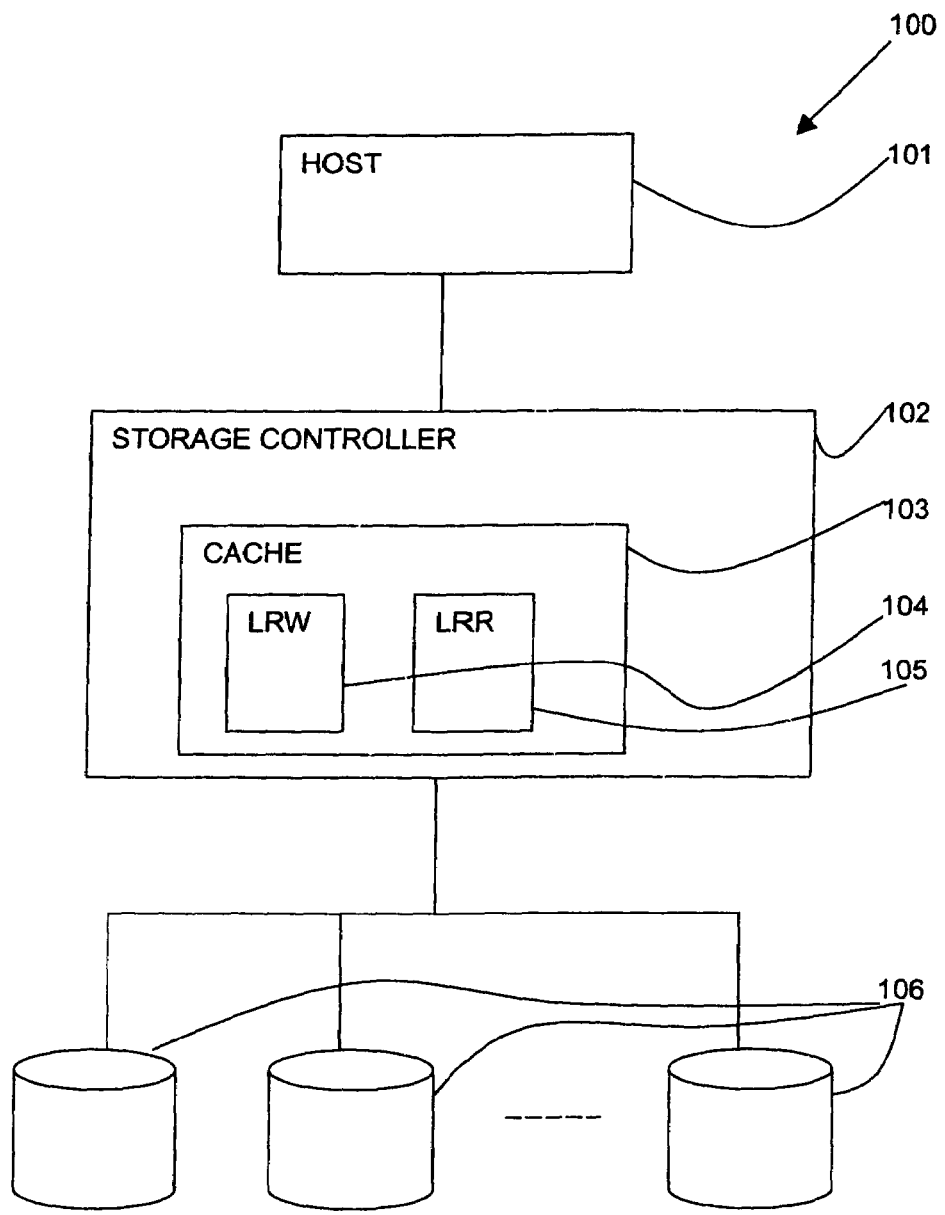
FIG. 1 is a block diagram of a data storage system in accordance with the present invention.

Referring to FIG. 1, a data storage system 100 is shown. The data storage system 100 of the figure is a simple system with a single host computer 101. Multiple host computers may be provided sharing common storage means.

A storage controller 102 controls the storage in a data storage means 106 which may be any storage medium including a disk drive or an array of disk drives 106, for example, a RAID array of disk drives could be used. The storage controller 102 has a cache 103 in which data is temporarily retained until it is subsequently destaged to the data storage means 106.

Data regions are stored in the cache 103. The storage controller 102 uses an algorithm to determine which region of data in the cache 103 to destage next.

The algorithm uses two lists 104, 105 both of which are LRU (Least Recently Used) lists. The lists contain entries referencing the data regions stored in the cache 103. The entries are data region descriptors.

A data region is an arbitrary unit of data which may be referred to as a track. In an example implementation, a track is 64 k bytes. A data descriptor on the LRW or LRR lists 104, 105 represents a track and each track is represented on each list 104, 105 exactly 0 or 1 time. A track may have subsets referred to as pages. In an example implementation, a page is 4 k bytes giving 16 pages in a track. Each of the pages in a track may be dirty, clean or absent. In practice, there may also be subsets of pages.

The first list 104 is for dirty data which is data that has been received from the host 101. The first list 104 is referred to as the LRW (Least Recently Written) list. The second list 105 is for clean data which is data which has been destaged to the data storage means 106 and a copy is retained in the cache 103. The second list 105 is referred to as the LRR (Least Recently Read) list.

Figure 2:
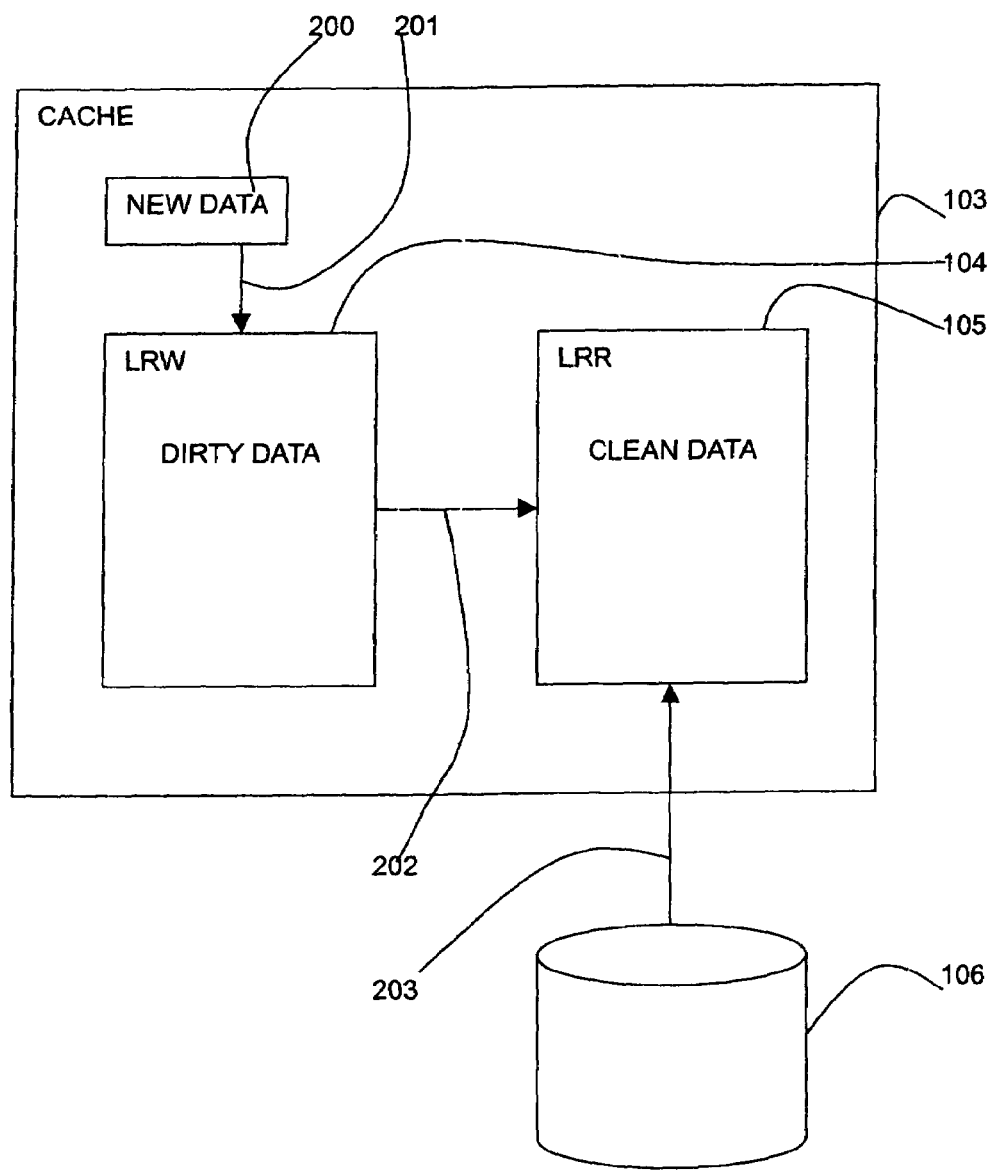
FIG. 2 is a block diagram of part of the data storage system of FIG. 1.

Referring to FIG. 2, a detail of FIG. 1 is provided showing the cache 103 with the LRW list 104 and the LRR list 105. A data region in the cache 103 will always be on at least one list 104, 105 and may be on both lists.

When the dirty data is initially stored 200 in the cache 103, a corresponding entry 201 is created for it on the dirty LRW list 104. When the data is destaged and marked clean, it is deleted from the LRW list 104 and added 202 to the LRR list 105.

Additionally, a data region may be partly dirty and partly clean. As described above, a data region in the form of a track may have some dirty pages and some clean pages. In this case the track would be on both lists 104, 105, since it must be possible to find it both when searching for a destage candidate and when searching for a purge candidate. Individual pages can be destaged or purged, rather than doing this at track level.

There is also another route onto the LRR list 105. In a general read/write cache 103, there are read commands from the host 101 which are cache misses. In this case, data is fetched from the data storage means 106 and may be retained in the cache 103 to satisfy further read commands from the host 101. A corresponding entry 203 is made for the data on the LRR list 105.

This is particularly beneficial in an environment where the storage controller 102 may be accessed from multiple hosts, since multiple hosts often utilise some regions of the disks for storing shared data and consequently multiple hosts may read the same disk region frequently.

There is a problem of how to assign suitable priority to data which was dirty but has been destaged so is now marked as clean. This data region needs to be deleted from the LRW list and, potentially, added to the LRR list, if it is not there already. This data was created in cache some while ago so to add it to the "recent" end of the LRR list would be giving it excessive priority. Conversely, to add it to the "stale" end of the LRR list would unduly depress its priority and would be useless—it would be the next candidate for purging so, in a busy system, would be immediately discarded. Adding it to the middle of the LRR list would be arbitrary. This would also be potentially difficult as the middle point of the LRR list is not tracked.

In order to overcome this problem a flag is kept with each data region descriptor in the lists 104, 105, indicating whether or not the data region was ever read while it contained dirty data.

If a data region was read while dirty, then it is likely that another host will also read the same data region in the near future. Therefore, the data region is added to the head of the LRR list 105, if it is not already in the LRR list 105.

If the data region was not read while dirty then it is less likely that it will be read in the near future so it is not moved on the LRR list 105. If the data region is already in the LRR list 105 then its position in the list is unchanged. If the data region is not in the LRR list 105 then the data region is discarded.

A further enhancement to the use of the "read" flag is to timestamp the region of cached data each time it is read. Using this approach, if a data region was read a long time ago it can be treated as having lower read-retention priority so the decision can be made not to add it to the LRR list 105.

Figure 3:
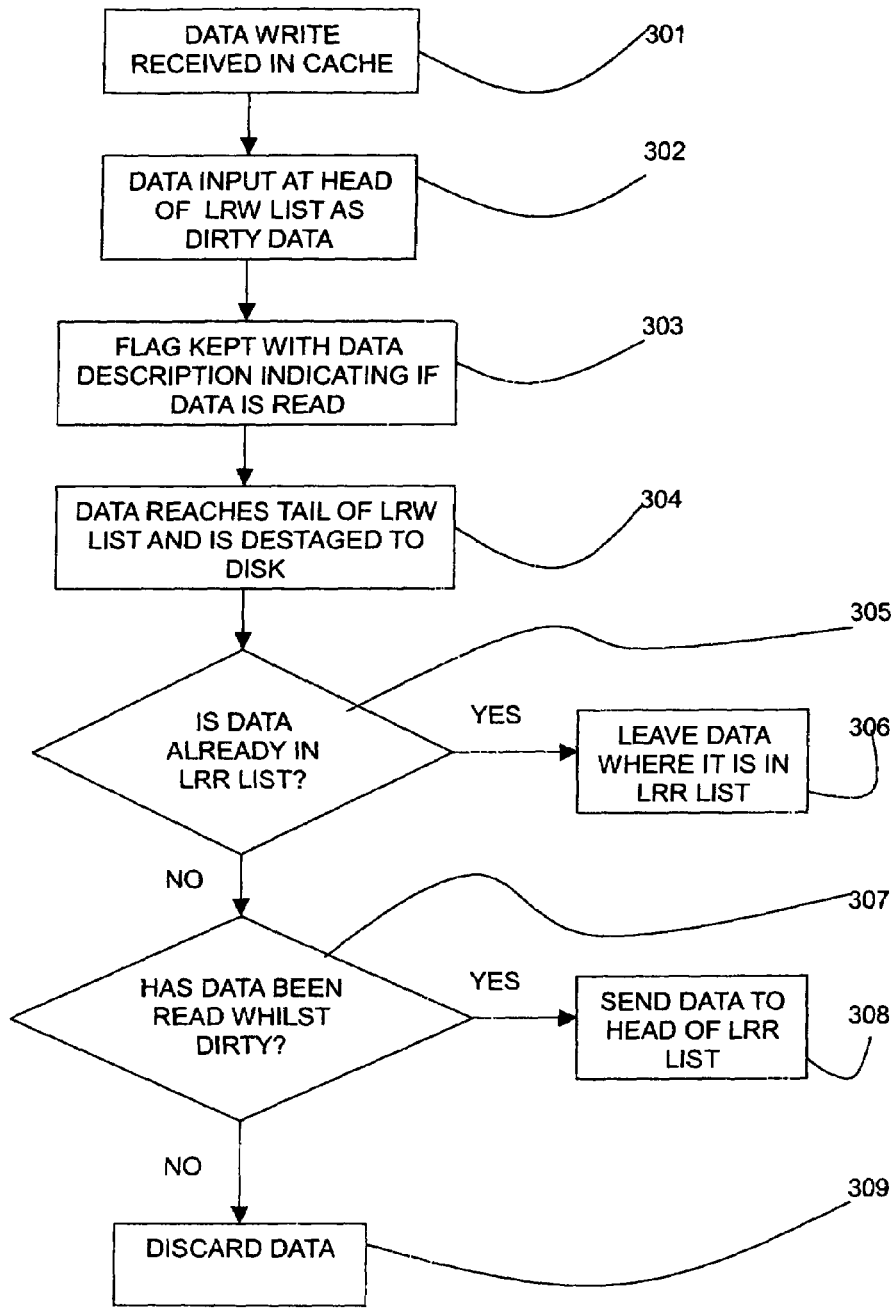
FIG. 3 is a flow diagram of a method in accordance with the present invention.

Referring to FIG. 3, a flow diagram shows a method of referencing data regions in the lists 104, 105. A data write is first received 301 in the cache. A data descriptor for the data is input 302 at the head of the LRW list as dirty data. A flag is kept 303 with the data descriptor indicating if the data is read. The data descriptor moves down the LRW list and, when it reaches 304 the tail of the LRW list, it is destaged to data storage means.

It is then determined 305 if the data descriptor is already in the LRR list. If it is already in the LRR list, the data descriptor is left 306 where it is in the LRR list.

If the data descriptor is not already in the LRR list, it is then determined 307 if the data has been read whilst it was dirty. If the data has been read whilst dirty, the data descriptor is sent 308 to the head of the LRR list. If the data has not been read whilst dirty, the data is discarded.

The following is a detailed description of the described method. The following should be noted.

Virtual Track (VT) is the jargon used for a data region in the cache, which contains some dirty data, some clean data or both.

Cache directory (CD) is the jargon used for the overall directory of cache elements.

To be considered for a read or write hit, or for destaging or purging, a VT must be in the CD.

Two queues are maintained:
LRW queue of VTs with ANY pages containing some dirty data.
LRR queue of VTs with ANY pages containing no dirty data.
 General Rules:
VTs get added/moved to the head of the LRW queue whenever they are populated with one or more dirty sectors.
VTs get added/moved to the head of the LRR queue whenever they are read and contain a clean page.
VTs which get read have their "read" flag set.
When a VT which is not already on the LRR queue is destaged and marked clean, it is added to the head of the LRR queue if the "read" flag is set. Otherwise it is deleted.
 Rules in Detail:
 Dirty VT inserted into CD:
The VT is added to the head of the LRW queue.
 Clean VT inserted into CD:
The VT is added to the head of the LRR queue.
 Dirty data merged into VT in LRW queue:
The VT is moved to the head of the LRW queue.
 Dirty data merged into VT in LRR queue:
The VT is added to the head of the LRW queue.
VT remains in LRR queue if it retains any clean pages.
 Dirty data merged into VT in both queues:
The VT is moved to the head of the LRW queue.
 VT remains in LRR queue if it retains any clean pages.
 Clean data merged into VT in LRW queue:
VT is left at current location in LRW queue.
VT is added to the head of the LRR queue if it now contains any clean pages.
"Read" flag is set.
 Clean data merged into VT in LRR queue:
VT is moved to the head of the LRR queue.
 Clean data merged into VT in both queues:
VT is left at current location in LRW queue.
VT is moved to the head of the LRR queue.
"Read" flag is cleared.
 Last clean page purged from VT at end of LRR queue:
VT is deleted from end of LRR queue.
 Dirty span removed by invalidation:
If VT no longer contains any dirty data it is deleted from LRW queue.
 Clean span removed by invalidation:
If VT no longer contains any clean pages it is deleted from LRR queue.
 Mixed span removed by invalidation:
If VT no longer contains any clean pages it is deleted from LRR queue.
If VT no longer contains any dirty data it is deleted from LRW queue.

The above method has the advantage that it identifies data to be preserved in the cache and data which need not be preserved and can be destaged to a data storage means.

Only dirty regions of the cache are protected against power failure. At runtime a table of the dirty pages is maintained so that, if power fails, the pages which need to be backed up can be identified.

The described method particularly improves write performance for RAID 5 storage arrays by permitting data coalescing into full-stride writes.

The described technology could be used in disk drives, disk controllers/adapters and file servers.

Modifications and improvements may be made to the foregoing without departing from the scope of the present invention.

What is claimed is:

1. A computer program product stored on a computer readable storage medium, comprising computer readable program code instructions for retaining data in a data cache comprising virtual tracks of data by performing:
 referencing dirty data stored in the data cache using a first least recently used list, said first least recently used list having a head and a tail; and
 referencing clean data stored in the data cache using a second least recently used list, said second least recently used list having a head and a tail;
 wherein the dirty data is destaged from the data cache when the dirty data reaches the tail of the first least recently used list and the clean data is purged from the data cache when the clean data reaches the tail of the second least recently used list.

2. A computer program product as claimed in claim 1, wherein the dirty data is destaged to a data storage device and deleted from the first least recently used list and reference to the dirty data so destaged is added to the second least recently used list and a copy of the dirty data so destaged is retained in the cache as clean data.

3. A computer program product as claimed in claim 1, wherein a read command comprising a cache miss fetches data from a data storage device and the data is retained in the cache with a reference in the second least recently used list.

4. A computer program product as claimed in claim 1, further performing: keeping a flag with each data reference in the first least recently used list indicating whether or not the data has been read while on the first least recently used list.

5. A computer program product as claimed in claim 1, wherein, if the data was read when referenced in the first least recently used list, the data is added to the head of the second least recently used list when the data is destaged.

6. A computer program product as claimed in claim 1, wherein, if the data was not read when referenced in the first least recently used list, the data is one of maintained in the current position in the second least recently used list or discarded.

7. A computer program product as claimed in claim 4, wherein keeping the flag comprises including a timestamp each time the data is read.

8. A computer program product as claimed in claim 1, wherein a virtual track of the data comprises partially dirty data and partially clean data and the virtual track is referenced in both the first least recently used list and second least recently used list.

9. A data storage system comprising:
a storage controller comprising a cache;
wherein the cache comprises a first least recently used list for referencing dirty data which is stored in the cache, said first least recently used list having a head and a tail, and a second least recently used list for referencing clean data which is stored in the cache, said second least recently used list having a head and a tail;
wherein the dirty data is destaged from the cache when the dirty data reaches the tail of the first least recently used list and the clean data is purged from the cache when the clean data reaches the tail of the second least recently used list.

10. A data storage system as claimed in claim 9, wherein the dirty data is destaged to a the data storage device and deleted from the first least recently used list and reference to the destaged data is added to the second least recently used list and a copy of the destaged data is retained in the cache as clean data.

11. A data storage system as claimed in claim 9, wherein a read command comprising a cache miss fetches data from the data storage device and the data is retained in the cache with a reference in the second least recently used list.

12. A data storage system as claimed in claim 9, wherein a flag is provided with each data reference in the first least recently used list indicating whether or not the data has been read while on the first least recently used list.

13. A data storage system as claimed in claim 9, wherein, if the data was read when referenced in the first least recently used list, the data is added to the head of the second least recently used list when the data is destaged.

14. A data storage system as claimed in claim 9, wherein, if the data was not read when referenced in the first least recently used list, the data is one of maintained in the current position in the second least recently used list or discarded.

15. A data storage system as claimed in claim 12, wherein the flag comprises a timestamp each time the data is read and the timestamp is adapted for prioritizing the position of the data reference in the second least recently used list.

16. A data storage system as claimed in claim 9, wherein a region of the data comprises partially dirty data and partially clean data and the region is referenced in both the first least recently used list and second least recently used list.

17. A method for data retention in a data cache, comprising:
referencing dirty data stored in the data cache in a first least recently used list, said first least recently used list having a head and a tail; and
referencing clean data in the data cache in a second least recently used list, said second least recently used list having a head and a tail;
wherein the dirty data is destaged from the data cache when the dirty data reaches the tail of the first least recently used list and the clean data is purged from the data cache when the clean data reaches the tail of the second least recently used list.

18. A computer program product as in claim 1, wherein the dirty data comprises data received from a host computer.

19. A computer program product as in claim 1, wherein the clean data comprises data destaged to a storage device.

20. A computer program product as in claim 7, wherein the timestamp is adapted for prioritizing the position of the data reference in the second least recently used list.

21. A computer program product as in claim 1, wherein when a virtual track comprising dirty data is inserted into the data cache, a reference to the virtual track is added to the head of the first least recently used list.

22. A computer program product as in claim 1, wherein when a virtual track comprising clean data is inserted into the data cache, a reference to the virtual track is added to the head of the second least recently used list.

23. A computer program product as in claim 1, wherein when dirty data is merged into a virtual track referenced in the first least recently used list, a reference to the virtual track is moved to the head of the first least recently used list.

24. A computer program product as in claim 1, wherein when dirty data is merged into a virtual track referenced in the second least recently used list, a reference to the virtual track is added to the head of the first least recently used list and the reference to the virtual track remains in the second least recently used list if the virtual track comprises any clean pages.

25. A computer program product as in claim 1, wherein when dirty data is merged into a virtual track referenced in both the first least recently used list and the second least recently used list, the reference in the first least recently used list is moved to the head of the first least recently used list and the reference in the second least recently used list remains if the virtual track comprises any clean pages.

26. A computer program product as in claim 1, wherein when clean data is merged into a virtual track referenced in the first least recently used list a read flag is set for the virtual track; the reference is left at the current location in the first least recently used list and a reference to the virtual track is added to the head of the second least recently used list if the virtual track comprises clean pages.

27. A computer program product as in claim 1, wherein when clean data is merged into a virtual track, a reference to the virtual track in the second least recently used list is moved to the head of the second least recently used list.

28. A computer program product as in claim 1, wherein when clean data is merged into a virtual track referenced in both the first least recently used list and the second least recently used list, a read flag is cleared for the virtual track, and the reference to the virtual track in the first least recently used list is left at the current location and the reference to the virtual track in the second least recently used list is moved to the head of the second least recently used list.

29. A computer program product as in claim 1, wherein when a last clean page of data is purged from a virtual track referenced at the end of the second least recently used list, the reference to the virtual track is deleted from the end of the second least recently used list.

30. A computer program product as in claim 1, wherein when a virtual track referenced in the first least recently used list no longer contains any dirty data, the reference to the virtual track is deleted.

31. A computer program product as in claim 1, wherein when a virtual track referenced in the second least recently used list no longer contains any clean pages, the reference to the virtual track is deleted.

32. A data storage system as in claim 9, wherein when the data is destaged, the data is written to an external storage device.

33. A data storage system as in claim 9, further comprising a data storage device coupled to the storage controller.

34. A data storage system as in claim 33, wherein the data storage device comprises at least one disk drive.

35. A host computer connected to a data storage system comprising:
- a storage controller comprising a cache;
- wherein the cache comprises a first least recently used list for referencing dirty data which is stored in the cache, said first least recently used list having a head and a tail, and a second least recently used list for referencing clean data which is stored in the cache, said second least recently used list having a head and a tail;
- wherein the dirty data is destaged from the cache when the dirty data reaches the tail of the first least recently used list and the clean data is purged from the cache when the clean data reaches the tail of the second least recently used list.

36. A data storage system adapted for retaining data in a data cache, the system comprising:
- means for referencing dirty data stored in the data cache using a first least recently used list, said first least recently used list having a head and a tail;
- means for referencing clean data stored in the data cache using a second least recently used list, said second least recently used list having a head and a tail; and,
- means for destaging the dirty data from the data cache when the dirty data reaches the tail of the first least recently used list and means for purging the clean data from the data cache when the clean data reaches the tail of the second least recently used list.

37. A computer program stored on a computer readable medium and executable by a data processor of a data storage unit that is coupled to a plurality of disk drives, comprising program code, responsive to a data write being received in a data cache, for placing a data descriptor for the data at a head of a Least Recently Written (LRW) list as dirty data, and for maintaining a flag with the data descriptor for indicating if the data is read; said program code being further responsive to the data descriptor moving down the LRW list, until it reaches a tail of the LRW list, for destaging the data to at least some of said plurality of disk drives and for determining if the data descriptor is currently in a Least Recently Read (LRR) list and, if the data descriptor is currently in the LRR list, maintaining the data descriptor at its current location in the LRR list, while if the data descriptor is currently not in the LRR list, testing the flag to determine if the data has been read while the data descriptor was in the LRW list and, if the data was read while in the LRW list, the data descriptor is placed at the head of the LRR list, otherwise the data is discarded.

38. A computer program as in claim 37, where said plurality of disk drives comprise a RAID 5 array of disk drives.

39. A computer program as in claim 37, where said flag comprises a timestamp.

* * * * *